United States Patent [19]

Shimalla

[11] Patent Number: 4,555,811
[45] Date of Patent: Dec. 3, 1985

[54] EXTENSIBLE MICROFINE FIBER LAMINATE

[75] Inventor: Charles J. Shimalla, Kendall Park, N.J.

[73] Assignee: Chicopee, New Brunswick, N.J.

[21] Appl. No.: 620,194

[22] Filed: Jun. 13, 1984

[51] Int. Cl.$^4$ .......................................... A41B 13/10
[52] U.S. Cl. .............................. 2/51; 2/114;
    2/DIG. 7; 128/132 D; 128/132 R; 156/62.8;
    156/73.1; 156/308.2; 156/183; 428/152;
    428/212; 428/297; 428/298; 428/296; 428/284;
    428/286; 428/373; 428/903; 428/913
[58] Field of Search ............... 156/62.8, 73.1, 308.2,
    156/290, 183; 428/913, 903, 284, 298, 369, 370,
    373, 152, 156, 171, 172, 212, 286, 374, 296;
    2/DIG. 7, 114, 51; 128/132 D, 132 R

[56] References Cited

U.S. PATENT DOCUMENTS

| | | | |
|---|---|---|---|
| 2,864,362 | 12/1958 | Hermanson et al. | 128/156 |
| 3,477,084 | 11/1969 | Thomas | 15/104.93 |
| 3,544,420 | 12/1970 | Murphy et al. | 161/129 |
| 3,597,299 | 8/1971 | Thomas et al. | 161/57 |
| 3,650,882 | 3/1972 | Thomas | 161/122 |
| 3,837,995 | 9/1974 | Floden | 161/150 |
| 3,879,257 | 4/1975 | Gentile et al. | 162/112 |
| 4,075,382 | 2/1978 | Chapman et al. | 428/192 |
| 4,196,245 | 4/1980 | Kitson et al. | 428/198 |
| 4,208,459 | 6/1980 | Becker et al. | 428/154 |
| 4,504,977 | 3/1985 | King et al. | 2/DIG. 7 |
| 4,508,113 | 4/1985 | Maloney | 428/296 |

Primary Examiner—James J. Bell
Attorney, Agent, or Firm—Leonard Kean

[57] ABSTRACT

An extensible water impervious laminated material having an improved hydrostatic head at higher extension is described. A preferred embodiment comprises an inner creped hydrophobic microfine fiber structure sandwiched between and bonded to two reinforcing layers of nonwoven fibers, said microfine fiber structure comprising at least one ply of microfine fibers having a fiber diameter of up to 10 microns. This material is especially useful as an operating room gown.

31 Claims, 2 Drawing Figures

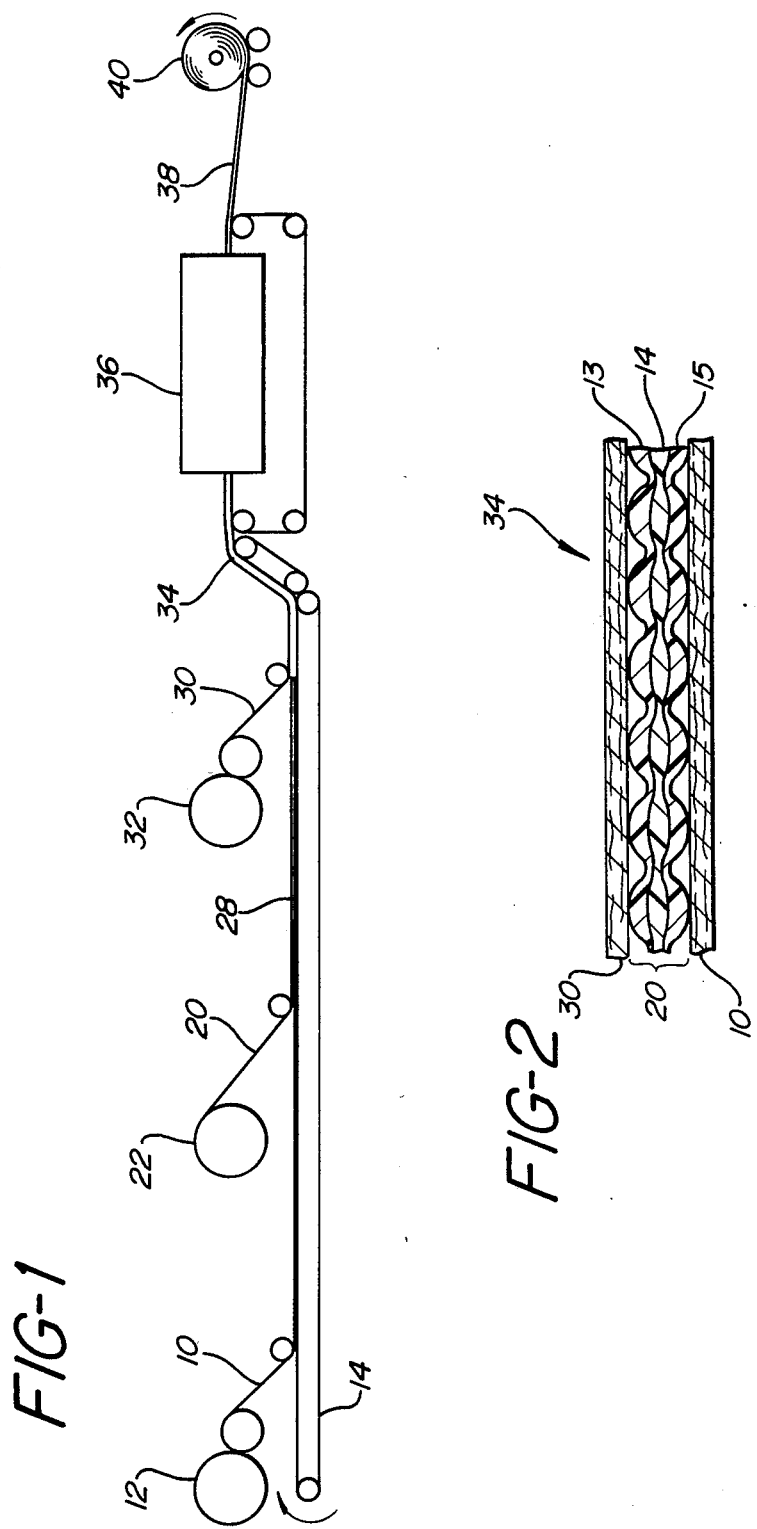

EXTENSIBLE MICROFINE FIBER LAMINATE

This invention relates to extensible water impervious microfine fiber laminated materials having improved hydrostatic heads at higher extensions and, more particularly, to absorbent disposable operating room gowns which are impermeable to the passage of microorganisms and fluids.

BACKGROUND OF THE INVENTION

Composite fabrics for use in surgical gowns, surgical drapes and the like, are well known. The purpose of these fabrics is to place a bacteria barrier between the aseptic operative field and areas which are incapable of surgical cleansing. It it essential that such fabrics possess a high liquid strikethrough resistance (measured by the hydrostatic head test), high bacteria strikethrough resistance, and adequate strength and tear resistance. These fabrics should be sufficiently flexible and drapable. The operating room gown, in particular, must function, during the course of an operation, to prevent contamination of the patient, surgical instruments and other personnel through contact with the wearer and to prevent clothes of the wearer from becoming saturated with blood and other liquids. Previous operating room gowns composed of a melt blown layer or layers with one or two reinforcement layers of nonwoven fabric, generally have the deficiency that as the laminated composite is extended, as in the case of the surgeon bending his elbow, the melt blown fabric develops holes and loses its barrier properties. (These barrier properties can be measured by the hydrostatic head test described hereinafter.) The melt blown fabric has a lower elongation than that of the reinforcing layer or layers, so that during extension of the composite, the melt blown fabric will fail (rupture) before the reinforcing layers fail. Thus, it is of little use to provide a high tensile strength reinforcing layer if the barrier properties of the composite are lost by extension of the melt blown fabric.

In accordance with the present invention, a creped microfine fiber layer (preferably melt blown) is incorporated as the barrier layer. As a result thereof, the extension of the laminated fabric will not cause deterioration of the barrier properties until much higher levels of extension are reached. In addition, a much softer fabric laminate will also result due to the much greater extensibility of the microfine fiber layer. Furthermore, the microfine fiber (melt blown layer) may be creped to a sufficient degree of compaction such that it will be virtually unaffected at the rupture elongation of the reinforcing layer or layers.

Although the microfine fibers utilized in the present invention are preferably produced by melt blowing, such microfine fibers can also be produced, for instance by a centrifugal spinning operation (see Vinicki's U.S. Pat. No. 3,388,194) and by other methods.

Although the laminate of the present invention is particularly useful in the case of operating room gowns which are subject to considerable extension at the elbows, nevertheless such laminate is also suitable for use as an operating room drape, a tray cover for surgical instruments, laparotomy packs, obstetric packs, backing layers for diapers or sanitary napkins and for any other application wherein an impermeable material would be desirable. The material is also suitable for surgical face masks.

The Prior Art

The Kitson et al. U.S. Pat. No. 4,196,245 describes a composite nonwoven fabric which comprises at least two hydrophobic plies of microfine fibers and at least one nonwoven cover ply. There is no disclosure in Kitson concerning the use of creped plies of microfine fibers.

Floden in U.S. Pat. No. 3,837,995 describes a web containing one or more layers of melt blown fibers and one or more layers of larger diameter natural fibers. No creping of the melt blown layers of fibers is disclosed.

The Thomas U.S. Pat. No. 3,650,882 discloses a multi-ply paper towel which has an elastically extensible inner web of creped tissue paper and two outer webs which are bonded to either side of the inner web. The structure of Thomas is designed so as to achieve materially greater liquid absorbency. In accordance with the present invention, on the other hand, the purpose of the creped inner ply of microfine fibers is to promote the nonabsorbency of the laminated material, since said creped inner layer will prevent liquid strike through even after considerable extension of the laminate (such as the bending of the surgeon's elbow).

The Chapman et al. U.S. Pat. No. 4,075,382 discloses a disposable nonwoven surgical towel having five plies. The center-most ply consists of a low-density, melt blown nonwoven material, which is, however, not creped.

The Hermanson et al. U.S. Pat. No. 2,864,362 and the Thomas U.S. Pat. No. 3,477,084 each disclose an absorbent wipe or dressing having a plurality of layers, the inner layers being constructed of creped material. However, the inner creped layers are absorbent rather than fluid impervious as is the case in accordance with the present invention.

The Thomas et al. U.S. Pat. No. 3,597,299 discloses a disposable washcloth which includes creped cellulose wadding layers. The Murphy et al. U.S. Pat. No. 3,544,420 discloses a creped tissue product formed by at least two superimposed sheets of creped tissue. In both cases the creped material is useful to improve the absorbency rather than the water impermeability of the product. The Becker et al. U.S. Pat. No. 4,208,459 discloses a method of creping a fibrous web and the Gentile et al. U.S. Pat. No. 3,879,257 relates to absorbent unitary laminate-like fibrous webs.

The present invention provides a soft drapable composite which is impervious to water. In accordance with a preferred embodiment of the present invention, the outer reinforcing layers utilize conjugate fibers composed of higher and lower melting components. This preserves the integrity of the higher melting component in view of the fact that the fusion process is carried out below the melting temperature of the higher melting component. The preservation of the integrity of the fibers maintains the strength in the reinforcing layers. Furthermore in accordance with a further preferred embodiment of the present invention, the melt temperature of the outer layers of the hydrophobic microfine fiber structure is chosen so as to substantially match the melt temperature of the lower melting component of the conjugate fiber. In this manner a far stronger and more intimate bond is formed, especially in the instance wherein the same material is used for the outer ply of the hydrophobic microfine fiber structure as well as the lower melting component of the conjugate fiber. Furthermore the bonding of the hydrophobic microfine fiber structure to the conjugate fibers can take place without significantly changing the hand or moisture vapor transmission of the hydrophobic microfine fiber structure. These features are disclosed, per se, in copending application No. 588,038 filed Mar. 9, 1984.

SUMMARY OF THE INVENTION

In accordance with the present invention, there is provided an extensible water impervious laminated material having an improved hydrostatic head at higher extension, comprising at least one reinforcing layer of nonwoven fibers bonded to at least one hydrophobic creped ply of microfine fibers having a fiber diameter of up to 10 microns.

The preferred embodiment of the present invention provides an extensible water impervious laminated material having an improved hydrostatic head at higher extension, comprising an inner creped hydrophobic microfine fiber structure sandwiched between and bonded to two reinforcing layers of nonwoven fibers, said hydrophobic microfine fiber structure comprising at least one ply of microfine fibers having an average fiber diameter of up to 10 microns. The reinforcing layers preferably consist of conjugate fibers, which may optionally be blended with from 5–40% of nonconjugate fibers such as rayon or polyester fibers which are useful for improving the dyeability and softness of the laminated material. The creped hydrophobic microfine fiber structure may comprise two or more plies bonded together. These plies are preferably prepared by melt blowing and may consist of polyethylene, polyamide, polyethylene terephthalate, polybutylene terephthalate or polypropylene, although virtually any thermoplastic polymer or polymer blend may be utilized.

The reinforcing layers of nonwoven fabric may consist of a spun bonded nonwoven material or a restraining belt bonded high density polyethylene/polyethylene terephthalate sheath/core bicomponent fiber fabric, which in turn may be blended with from 5–40% rayon or polyester fibers.

The creped hydrophobic microfine fiber structure may be prepared by any suitable creping process, although the MICREX Microcreper compressive treatment process is especially suitable. In accordance with the present invention, the degree of compaction of the creped ply of microfine fibers in the machine direction is preferably at least 10%. The commercially available creped materials are usually compacted to a greater extent in the machine direction, and accordingly, when an operating room gown is manufactured with the material of the present invention the direction of greatest extensibility thereof should coincide with the lengthwise axis of the sleeves of the garment. In accordance with a further preferred embodiment of the present invention, there is provided a water impervious laminated material having an improved hydrostatic head at higher extension, comprising at least one reinforcing layer of conjugate fibers, said layer of conjugate fibers having a first face and an opposite face, said conjugate fibers being composed of a lower melting component and a higher melting component, wherein a substantial proportion of the surfaces of said conjugate fibers comprises said lower melting component, said lower melting component of said conjugate fibers which lie on said first face being fuse bonded to a first ply of a creped hydrophobic structure comprising multiple plies of microfine fibers having a fiber diameter of up to 10 microns, which structure comprises said first ply and at least one additional ply, said first ply of said hydrophobic microfine fiber structure being thermoplastic and possessing a lower melt temperature than said additional ply of said hydrophobic microfine fiber structure, said lower melting component of said conjugate fibers having been fuse bonded at a temperature below the melt temperature of said higher melting component of said conjugate fibers so that the latter component retains its initial fiber-like integrity.

In accordance with yet a further embodiment of the present invention there is provided an extensible water impervious laminated material having an improved hydrostatic head at higher extension, comprising an inner creped hydrophobic microfine fiber structure sandwiched between two reinforcing layers of conjugate fibers, each of said layers of conjugate fibers having a first face and an opposite face, said conjugate fibers being composed of a lower melting component and a higher melting component, wherein a substantial proportion of the surfaces of said fibers comprises said lower melting component, said hydrophobic microfine fiber structure comprising a three-ply structure having an inner ply sandwiched between and bonded to two outer plies, each ply comprising a web of microfine fibers having a fiber diameter of up to 10 microns, said inner ply of said hydrophobic microfine fiber structure having a melt temperature higher than the melt temperatures of each of said outer plies of said hydrophobic microfine fiber structure, said lower melting components of both layers of said conjugate fibers which lie on said first face having been fuse bonded to the adjacent outer plies of said hydrophobic microfine fiber structure at a temperature below the melt temperature of said higher melting component of said conjugate fibers, so that the latter component retains its initial fiber-like integrity.

The melt temperature of the lower melting component of the conjugate fibers is preferably no more than 35° C. higher or lower than the melt temperature of the first ply of the hydrophobic microfine fiber structure. In the instance wherein the creped hydrophobic microfine fiber structure is sandwiched between two reinforcing layers of conjugate fibers, the melt temperature of each of the outer layers of the hydrophobic microfine fiber structure is preferably no more than 35° C. higher or lower than the lower melting component of the conjugate fibers in each of the reinforcing layers.

In the instance wherein the creped hydrophobic microfine fiber structure comprises three plies, the inner ply may comprise isotactic polypropylene and the two outer plies may comprise ethylene/vinyl acetate copolymer. Alternatively, the inner ply of the three layer hydrophobic microfine fiber structure may comprise isotactic polypropylene and the two outer plies may comprise polyethylene. In the instance wherein the creped hydrophobic microfine fiber structure comprises two plies, the first ply which is bonded to the reinforcing layer may comprise ethylene/vinyl acetate copolymer, polypropylene, polyethylene, chlorinated polyethylene or polyvinyl chloride; and the second ply of the hydrophobic microfine fiber structure may comprise isotactic polypropylene.

In accordance with a further embodiment of the present invention, at least one of the two reinforcing layers of conjugate fibers may be blended with from 5–40% by weight of nonconjugate fibers. Preferably, rayon or polyester fibers may be used in this connection for dyeability and softness. Nevertheless, the specific nature and melt temperatures of the nonconjugate portions of the blend are not critical since the conjugate-rich material in the face of the reinforcing layer which is fused to the hydrophobic microfine fiber structure insures the good bonding features provided by the present invention. In the case of a creped hydrophobic microfine fiber structure which comprises three plies, the outer plies (which constitute the lower melting plies thereof) may consist of any suitable relatively low melting thermoplastic polymer such as ethylene/propylene copolymer, polyester copolymer, low density polyethylene, ethylene/vinyl acetate copolymer, high density polyethylene, chlorinated polyethylene or polyvinyl chloride. Although a preferred higher melting inner ply of the three ply hydrophobic microfine fiber structure may comprise isotactic polypropylene, nevertheless, a number of other higher melting thermoplastic materials, such as polyester or polyamide may also be used.

Although continuous filaments of conjugate fibers may be employed for the reinforcing layers in accordance with the present invention, nevertheless, the preferred conjugate fibers are textile length, that is they are fibers having lengths of from ¼ inch and preferably from ½ inch up to about 3 inches or more in length. Such conjugate fibers can be bicomponent fibers such as the sheath/core or side-by-side bicomponent fibers wherein there is a lower melting component and a higher melting component with a significant proportion and preferably a major proportion of the surface of the fiber being the lower melting component. Preferably the lower melting component is a polyolefin, and most preferably polyethylene. In many cases the sheath/core bicomponent fibers are preferred because they exhibit a better bonding efficiency than the side-by-side bicomponent fibers, and because in some cases the side-by-side bicomponent fibers may exhibit an excessive tendency to curl, crimp, or shrink during the heat bonding step. Both concentric and eccentric sheath/core bicomponent fibers can be used.

The nonwoven conjugate fiber reinforcing layers which are preferably used in accordance with the present invention can have basis weights from about 0.25 to about 3.0 ounces per square yard.

In the thermal bonding step the lower melting component of the conjugate fiber is at least partially fused so that where the fused surface touches another conjugate fiber, welding or fusing together of the two fibers will occur. It is important that the conjugate fibers remain fibers, i.e., that the higher melting component of the conjugate fiber not melt or shrink significantly and thereby become beads or the like.

The multiple ply creped hydrophobic microfine fiber structure used in the present invention may be prepared by laminating separate components together and thereafter said components may be heat bonded together. The present invention also includes a process for preparing an extensible water impervious laminated material having an improved hydrostatic head at higher extension, comprising at least one reinforcing layer of nonwoven fibers bonded to at least one hydrophobic creped ply of microfine fibers having a fiber diameter of up to 10 microns, said process comprising forming an assembly of a precreped ply of said microfine fibers and at least one reinforcing layer of nonwoven fibers placed adjacent thereto;
  subjecting said assembly to a temperature sufficient to fuse said layers of nonwoven fibers to said creped ply of microfine fibers; and cooling the assembly.

In accordance with one embodiment of the present invention there is provided a process for preparing a water impervious laminated material having an improved hydrostatic head at higher extension, comprising at least one layer of conjugate fibers, said layer of conjugate fibers having a first face and an opposite face, said conjugate fibers being composed of a lower melting component and a higher melting component, wherein a substantial proportion of the surfaces of said conjugate fibers comprises said lower melting component, said lower melting component of said conjugate fibers which lie on said first face being fuse bonded to a first ply of a creped hydrophobic structure comprising multiple plies of microfine fibers having a fiber diameter of up to 10 microns, which structure comprises said first ply and at least one additional ply, said first ply of said hydrophobic microfine fiber structure being thermoplastic and possessing a lower melt temperature than said additional ply of said structure, said lower melting component of said conjugate fibers having been fuse bonded at a temperature below the melt temperature of said higher melting component of said conjugate fibers so that the latter component retains its initial fiber-like integrity;
  said process comprising forming an assembly of said hydrophobic microfine fiber structure which has been pre-creped and at least one layer of said conjugate fibers placed adjacent to said first ply of said hydrophobic microfine fiber structure;
  subjecting said assembly to a temperature sufficient to fuse said lower melting component of said conjugate fibers which lie on said first face as well as the first ply of the hydrophobic microfine fiber structure in contact with said conjugate fibers without fusing the higher melting component of said conjugate fibers nor the additional ply of the hydrophobic microfine fiber structure, while maintaining said assembly under minimal pressure;
  and cooling said assembly to resolidify said lower melting component of the conjugate fibers as well as said first ply of said hydrophobic microfine fiber structure, whereby said conjugate fibers are firmly bonded to said hydrophobic microfine fiber structure without impairing the integrity of said higher melting component of said fibers.

In a further embodiment of the present invention there is provided a process for preparing a water impervious laminated material having an improved hydrostatic head at higher extension comprising an inner creped hydrophobic microfine fiber structure sandwiched between two reinforcing layers of conjugate fibers, each of said layers of conjugate fibers having a first face and an opposite face, said conjugate fibers being composed of a lower melting component and a higher melting component, wherein a substantial proportion of the surfaces of said fibers comprises said lower melting component, said hydrophobic microfine fiber structure comprising a three-ply structure having an inner ply sandwiched between and bonded to two outer plies, each ply comprising a web of microfine fibers having a fiber diameter of up to 10 microns, said inner ply of said hydrophobic microfine fiber structure having a melt temperature higher than the melt temperatures of each of said outer plies of said hydrophobic microfine fiber structure, said lower melting components of both layers of said conjugate fibers which lie on said first faces having been fuse bonded to the adjacent outer plies of said hydrophobic microfine fiber structure at a temperature below the melt temperature of said higher melting component of said conjugate fibers, so that the latter component retains its initial fiber-like integrity;

> said process comprising forming an assembly of said hydrophobic microfine fiber structure which has been precreped, sandwiched between two layers of said conjugate fibers;
>
> subjecting said assembly to a temperature sufficient to fuse said lower melting components of said conjugate fibers which lie on said first faces in both of said layers thereof as well as both of said outer plies of said hydrophobic microfine fiber structure without fusing the higher melting components of said conjugate fibers nor the inner ply of the hydrophobic microfine fiber structure, while maintaining the assembly under minimal pressure;
>
> and cooling said assembly to resolidify said lower melting components of the fibers as well as said outer plies of said hydrophobic microfine fiber structure, whereby said fibers are firmly bonded to said hydrophobic microfine fiber structure without impairing the integrity of said higher melting component of said fibers.

The above-mentioned fusion steps may be carried out by means of a heated embossing calender or by the application of ultrasound in accordance with methods well known in the art. Furthermore, the thermal bonding step may also be carried out by any other suitable means for applying localized heat such as by sonic means, lasers, infrared heating or other types of radiant heating.

BRIEF DESCRIPTION OF THE DRAWINGS

FIG. 1 is a schematic side elevation of an apparatus suitable for carrying out the process of the invention; and FIG. 2 is a cross section of the laminated material of the present invention.

Referring first to FIG. 1, one preferred arrangement of an apparatus for carrying out the process of the invention is disclosed. The apparatus shown in FIG. 1 is suitable for making the laminated material of the invention comprising a core of a creped microfine fiber structure with facings of heat-fusible conjugate fibers on both faces of said core. The creped microfine fiber structure may consist of one or more plies. A web 10 of heat-fusible conjugate fibers is laid down as from a card 12 on an endless belt 14. A pre-creped hydrophobic microfine fiber structure 20, fed from let-off 22, is then laid on top of web 10. A laminated three-ply creped hydrophobic microfine fiber structure is utilized (as illustrated in FIG. 2). The plies of the microfine fiber structure 20 may have been independently creped prior to being laminated together; or alternatively said plies may have been fused together, in the flat state, prior to the creping step which is carried out on the resultant laminated structure. Although a number of different methods are known for creping materials, nevertheless a preferred method utilized in accordance with the creped structure 20, used in the present invention, is the MICREX Microcreper compressive treatment process which is a mechanical method for treating sheets or web structures in an air dry state. In accordance with the MICREX process, an untreated web, supported by a main roll is introduced into a converging passage, firmly gripped and conveyed into a main treatment cavity where the microcreping process takes place. By adjustment of controls, varying amounts of residual compaction and creped cross section can be attained, depending upon the desired result and the characteristics of the material being treated. The treated web passes through a secondary passage between rigid and flexible retarders which control the uniformity and degree of compaction. The fully microcreped web is then continuously discharged without conveyor belts or other support to a take-up reel, such as roller 22 in FIG. 1 of the present drawings. The hydrophobic microfine fiber structure 20, after having been laid upon web 10 forms a double layer web 28.

Web 28 is then passed under another station wherein a second web of heat-fusible conjugate fibers 30 is laid on top as from a card 32. Although webs 10 and 30 are preferably prepared from cards, nevertheless, air-laid webs may also be used although the latter procedure is not particularly suitable in the instance wherein the webs are light weight. Although webs 10 and 30 are preferably fuse bonded in a subsequent step, said webs 10 and 30 may have been initially fuse bonded, in a prior step, before they are laid on either side of the laminated structure 20.

After web 30 is laid on top of the double layer web 28 the resulting triple layer web 34 is then passed through a fusion unit 36 to fuse the lower melting component of the conjugate fibers in webs 10 and 30 while maintaining the integrity of the higher melting component of these fibers as fibers, and to fuse or soften the outer surfaces of the laminated creped hydrophobic microfine fiber structure 20 so as to securely bond webs 10 and 30 on either side of structure 20. When the multiple layer web emerges from the fusion unit 36, it cools to thereby form the material 38 of the invention. When the material 38 cools, the fused lower melting component of the conjugate fibers, solidifies, and bonds then form where their surfaces touch other fibers. The material 38 is then collected on a conventional wind-up 40. Any suitable means of fusion bonding may be used in fusion unit 36, such as by means of a conventional heated embossing calender, or by subjecting the assembly to ultrasonic radiation.

FIG. 2 illustrates a cross sectional view of the laminated material of the present invention. Thus, the laminated creped microfine fiber structure 20, comprising low melting outer plies 13 and 15 and higher melting inner ply 14, are shown sandwiched between layers 10 and 30 of conjugate fibers. The temperature of the fusion unit 36 is maintained below that of the melt temperature of the higher melting components of the conjugate fibers as well as below the melt temperature of inner ply 14 of the laminated creped microfine fiber structure 20. In the instance wherein structure 20 consists of a polypropylene core 14 and low melting ethylene vinyl acetate copolymer plies 13 and 15, sandwiched between two layers of conjugate fibers 10 and 30 comprising a polyethylene/polyethylene terephthalate sheath/core bicomponent fiber, the temperature maintained in the fusion unit is preferably in the range of 120° C. to 130° C.

The exact temperatures employed in the fusion unit 36 will depend upon the nature of the conjugate fiber used and the dwell time employed in the fusion unit. For instance when the lower melting component of the conjugate fiber is polyethylene, the bonding temperature is usually from about 110° C. to about 150° C., and when the lower melting component is polypropylene, the bonding temperature is usually from about 150° C.

to about 170° C. Specific conditions under which the thermal bonding is achieved are illustrated in the examples below. The temperatures referred to are the temperatures to which the fibers are heated in order to achieve bonding. In order to achieve high speed operations, much higher temperatures with short exposures times can be used.

The examples below illustrate various aspects of the invention.

EXAMPLE 1

A laminated material is made by a procedure analogous to that illustrated in FIG. 1 using a tricomponent creped hydrophobic microfine fiber structure consisting of a core of polypropylene microfine fibers sandwiched between two plies of low melting ethylene/vinyl acetate microfine fibers. The thickness of the tricomponent creped structure is 29 mil. The polypropylene core has a softening range of 110°-120° C. and a melting point of about 165° C.

The ethylene/vinyl acetate copolymer has a softening range of 90°-100° C. and a melting point of about 110° C.

Webs of through-air bonded conjugated fibers (0.5 ounces per square yard) prepared by carding are placed on either side of the tricomponent microfine fiber structure. The conjugate fibers consist of high density polyethylene/polyethylene terephthalate sheath/core bicomponent fibers, the core being concentric. The high density polyethylene in the conjugate fibers has a softening range of 110°-125° C. and a melting point of about 132° C. The polyethylene terephthalate core of the conjugate fibers has a softening range of 240°-260° C. and a melting point of about 265° C. The polyethylene comprises 50% of the conjugate fiber.

The conjugate fiber webs are laminated to the creped microfine fiber structure using an embossing calender at about 126° C. The resulting material is a soft drapable fabric composite which is impervious to water and in which the creped microfine fiber core does not rupture at the rupture elongation of the conjugate fiber webs.

Certain properties of the material obtained in accordance with Example 1 are as follows:
Thickness of each conjugate fiber facing: 10 mil
Weight of composite material: 2 ounces/yard$^2$ The material produced in accordance with Example 1 is suitable for use as an operating room gown which does not lose its barrier properties even after having been stretched 7% of its length. Furthermore, the material produced in accordance with Example 1 possesses improved integrity, durability and strength.

EXAMPLE 2

Example 1 is repeated with the following modifications:

Only a two component creped microfine fiber structure is used, the lower melting component (namely the ethylene/vinyl acetate copolymer) is placed facing upwardly with the next ply of polypropylene facing downwardly. Thereafter only one layer of the high density polyethylene/polyethylene terephthalate conjugate fibers is placed on top of the microfine fiber structure, with the lower layer of conjugate fibers being omitted. Otherwise, the bonding procedure is the same as that carried out in connection with Example 1. The resultant composite material is a soft drapable fabric, which upon extension, retains the hydrostatic head possessed by the unstretched fabric.

EXAMPLE 3A

A laminated material is made by a procedure analogous to that illustrated in FIG. 1 using a single hydrophobic creped ply of microfine fibers consisting of a 100% polypropylene melt blown web weighing 0.85 ounces per square yard. This polypropylene core has a softening range of 110°-120° C. and a melting point of about 165° C. A random web of 100% high density polyethylene/polyethylene terephthalate sheath/core bicomponent fibers weighing 0.8 ounces per square yard is placed on one side of the polypropylene core. This web is through-air bonded.

The high density polyethylene in the conjugate fibers has a softening range of 110°-125° C. and a melting point of about 132° C. The polyethylene terephthalate core of the conjugate fibers has a softening range of 240°-260° C. and a melting point of about 265° C. The polyethylene comprises 50% of the conjugate fiber. Thereafter, on the opposite side of the polypropylene core is placed a random web layer of 0.5 ounce per square yard and restraining belt bonded web made of 90% bicomponent fiber/10% rayon. Said bicomponent fibers are also conjugate fibers consisting of high density polyethylene/polyethylene terephthalate sheath/core bicomponent fibers, the core being concentric.

The two conjugate fiber webs are laminated to the creped microfine fiber web using an embossing calender at about 122° C. (both the embossed roll and the smooth roll were at 122° C.). The embossed roll was a cross-hatch pattern. The pressure on both sides of the laminated material was 150 pounds per lineal inch and the line speed was 30 feet per minute. A fixed gap of 0.0005 inch was used.

EXAMPLE 3B

A control sample was prepared, in an identical manner to the laminated material prepared in accordance with Example 3A, but the polypropylene core web was not creped.

TEST PROCEDURES

A number of comparative tests were conducted in order to compare the extensible melt blown laminate of Example 3A with the substantially identical laminate of Example 3B in which the polypropylene core was not creped. For the purpose of the following tests, the laminate of Example 3A is designated as the creped material and the laminate of Example 3B is designated as the control uncreped material.

Bursting Strength Test (Mullen Burst)

Both the control uncreped material and the creped material were subjected to the Mullen Burst test in accordance with ASTM D-3786-79. The results are set forth in Table 1. In this test a specimen of the fabric is clamped over an expandable diaphragm. The diaphragm is expanded by fluid pressure to the point of specimen rupture. The difference between the total pressure required to rupture the specimen and the pressure required to inflate the diaphragm is reported as the bursting strength.

TABLE 1

| | MULLEN BURST TEST | |
|---|---|---|
| Run No. | Control Uncreped | Creped (Unstretched) |
| 1 | 26.8 | 34.0 |
| 2 | 28.4 | 34.4 |

TABLE 1-continued

| | MULLEN BURST TEST | |
|---|---|---|
| Run No. | Control Uncreped | Creped (Unstretched) |
| 3 | 27.8 | 35.8 |
| | Average 27.7 lbs. | Average 34.7 lbs. |

From the above Table 1 it will be seen that the creping of the melt blown inner layer increases the burst strength by 25%, under standard testing conditions, as compared to that of the uncreped control.

Strip Tensile Strength Test

The control uncreped material and the creped material were subjected to a standard strip tensile test in accordance with ASTM D-1682-64. This test indicates both the breaking load and elongation of textile fabrics. The breaking load (machine direction) and the elongation at break are indicated in the following Tables 2 and 3 respectively, both for the uncreped control material and the creped material.

TABLE 2

| | STRIP TENSILE TEST MACHINE DIRECTION | |
|---|---|---|
| Run No. | Control Uncreped Peak Load | Creped Peak Load |
| 1 | 7.9 lbs. | 6.8 lbs. |
| 2 | 7.5 lbs. | 7.5 lbs. |
| 3 | 7.5 lbs. | 7.0 lbs. |
| 4 | 7.0 lbs. | 7.3 lbs. |
| 5 | 7.2 lbs. | 6.5 lbs. |
| | Average 7.4 lbs. | Average 7.0 lbs. |

TABLE 3

| | % ELONGATION AT BREAK (MACHINE DIRECTION) | |
|---|---|---|
| Run No. | Control Uncreped Peak Strain | Creped Peak Strain |
| 1 | 26.5% | 22.2% |
| 2 | 18.8% | 22.3% |
| 3 | 26.5% | 23.6% |
| 4 | 21.3% | 38.7% |
| 5 | 21.4% | 19.7% |
| | Average 22.9% | Average 25.3% |

From Table 3, it will be seen that the average elongation at break of the creped material is approximately 10% higher than the average elongation at break of the uncreped control material.

Hydrostatic Head Test

In order to determine the water repellancy of the fabric, samples from both the uncreped control material and the creped material were subjected to a modification of the basic hydrostatic pressure test AATCC TM#127-1977, both in the unstretched condition (Table 4) and stretched at 7% (Table 5). In this test, a specimen is subjected to increasing water pressure while the surface is observed for leakage. The hydrostatic pressure test which was actually carried out differed in a minor manner from the standard hydrostatic pressure test AATCC TM#127-1977 in that the water reservoir was raised manually rather than automatically as in the standard test. Normally, the hydrostatic head test is carried out on fabric which is in a relaxed, i.e., an unstretched condition. In order to demonstrate the advantages of the present invention, the fabrics were stressed to a 7% elongation level (Table 5); they were then held in the extended position with a jig and the hydrostatic head test was carried out on the fabrics while they were in the extended condition. These are the samples referred to in the tables as "stretched at 7%". With respect to the data shown in Table 5, samples were cut 3½ inches wide and 10 inches long in the machine direction. A stretching jig was set up so that holders were 7 inches apart. Samples were placed in the stretcher and stretched to 7½ inches (7% stretch). A clamp was used to keep the fabric in a stretched state. Manual hydrostatic head testing was performed in accordance with the basic hydrostatic pressure test AATCC TM#127-1977 on the stretched fabric.

TABLE 4

| | HYDROSTATIC HEAD TEST (UNSTRETCHED) | |
|---|---|---|
| Run No. | Control Uncreped (cm) | Creped (cm) |
| 1 | 34.5 | 53.0 |
| 2 | 51.4 | 53.0 |
| 3 | 53.0 | 53.0 |
| 4 | 53.0 | 53.0 |
| 5 | 53.0 | |
| 6 | 45.8 | |
| | Average 48.4 ± 7.4 cm | Average 53.0 cm |

TABLE 5

| | HYDROSTATIC HEAD TEST (STRETCHED AT 7%) | |
|---|---|---|
| Run No. | Control Uncreped (cm) Stretched at 7% | Creped (cm) Stretched at 7% |
| 1 | 22.2 | 41.1 |
| 2 | 28.1 | 48.3 |
| 3 | 26.3 | 36.0 |
| 4 | 31.2 | 53.0 |
| 5 | 31.7 | 49.0 |
| 6 | 30.6 | 53.0 |
| | Average 28.3 ± 3.7 cm | Average 46.7 ± 6.8 cm |

As will be seen from Tables 4 and 5 the head on the uncreped cortrol material dropped from 48.4±7.4 cm in the unstretched condition, to only 28.3±3.7 cm when stretched at 7%, i.e., a decrease of 41.53%.

Conversely the creped material only dropped from 53 cm in the unstretched condition, to 46.7±6.8 cm when stretched at 7%. Thus there was very little loss of hydrostratic head of the creped material upon stretching. Furthermore, upon examining Tables 4 and 5, it will be seen that the hydrostatic head of the creped material, even after being stretched at 7%, was substantially as high as the hydrostatic head of the uncreped control material even before any stretching had occurred in the latter. These results clearly indicate that if an operating room gown is manufactured in accordance with the present invention, the bending of the elbow, resulting in a stretch of 7%, would not adversely affect the barrier properties thereof.

In general, the material of the present invention, when subjected to the hydrostatic head test at 7% elongation, retains at least about 70% of the hydrostatic head which is achieved at zero elongation.

I claim:

1. An extensible water impervious laminated material having an improved hydrostatic head at higher extension comprising at least one reinforcing layer of nonwoven fibers bonded to at least one hydrophobic creped ply of microfine fibers having a fiber diameter of up to 10 microns.

2. An extensible water impervious laminated material having an improved hydrostatic head at higher extension, comprising an inner creped hydrophobic microfine fiber structure, sandwiched between and bonded to two reinforcing layers of nonwoven fibers, said hydrophobic microfine fiber structure comprising at least one ply of microfine fibers having a fiber diameter of up to 10 microns.

3. An extensible water impervious laminated material having an improved hydrostatic head at higher extension, comprising an inner creped hydrophobic microfine fiber structure sandwiched between and fuse bonded to two reinforcing layers of nonwoven conjugate fibers, said hydrophobic microfine fiber structure comprising at least one ply of microfine fibers having a fiber diameter of up to 10 microns.

4. The material of claim 3 in which the creped hydrophobic microfine fiber structure comprises at least two plies of microfine fibers having a fiber diameter of up to 10 microns.

5. The material of claim 2 wherein the hydrophobic microfine fiber structure comprises polyethylene, polyethylene terephthalate, polypropylene, polybutylene terephthalate or polyamide.

6. The material of claim 2 wherein the layers of nonwoven fabric comprise high density polyethylene/polyethylene terephthalate sheath/core bicomponent fibers.

7. The material of claim 6 wherein the layers of nonwoven fabric are blended with from 5 to 40% by weight of rayon or polyester fibers.

8. The material of claim 2, in which the material has been prepared by a continuous process and wherein the degree of compaction of the creped ply of microfine fibers in the machine direction is at least 10%.

9. The material of claim 3 wherein the creped ply of microfine fibers was initially prepared by melt blowing.

10. An extensible water impervious laminated material having an improved hydrostatic head at higher extensions comprising at least one reinforcing layer of conjugate fibers, said layer of conjugate fibers having a first face and an opposite face, said conjugate fibers being composed of a lower melting component and a higher melting component, wherein a substantial proportion of the surfaces of said conjugate fibers comprises said lower melting component, said lower melting component of said conjugate fibers which lie on said first face being fuse bonded to a first ply of a creped hydrophobic structure comprising multiple plies of microfine fibers having a fiber diameter of up to 10 microns, which structure comprises said first ply and at least one additional ply, said first ply of said hydrophobic microfine fiber structure being thermoplastic and possessing a lower melt temperature than said additional ply of said hydrophobic microfine fiber structure, said lower melting component of said conjugate fibers having been fuse bonded at a temperature below the melt temperature of said higher melting component of said conjugate fibers so that the latter component retains its initial fiber-like integrity.

11. The material of claim 10, in which the melt temperature of the lower melting component of the conjugate fibers is no more than 35° C. higher or lower than the melt temperature of the first ply of the hydrophobic microfine fiber structure.

12. An extensible water impervious laminated material having an improved hydrostatic head at higher extensions comprising an inner creped hydrophobic microfine fiber structure sandwiched between two reinforcing layers of conjugate fibers, each of said layers of conjugate fibers having a first face and an opposite face, said conjugate fibers being composed of a lower melting component and a higher melting component, wherein a substantial proportion of the surfaces of said fibers comprises said lower melting component, said hydrophobic microfine fiber structure comprising a three-ply structure having an inner ply sandwiched between and bonded to two outer plies, each ply comprising a web of microfine fibers having a fiber diameter of up to 10 microns, said inner ply of said hydrophobic microfine fiber structure having a melt temperature higher than the melt temperatures of each of said outer plies of said hydrophobic microfine fiber structure, said lower melting components of both layers of said conjugate fibers which lie on said first face having been fuse bonded to the adjacent outer plies of said hydrophobic microfine fiber structure at a temperature below the melt temperature of said higher melting component of said conjugate fibers, so that the latter component retains its initial fiber-like integrity.

13. The material of claim 12, in which the melt temperature of each of the outer layers of the hydrophobic microfine fiber structure is no more than 35° C. higher or lower than the lower melting component of said conjugate fibers.

14. The material of claim 12, in which the inner ply of said hydrophobic microfine fiber structure comprises isotactic polypropylene and the two outer plies comprise ethylene/vinyl acetate copolymer.

15. The material of claim 10, wherein the conjugate fiber is a high density polyethylene/polyester sheath/core bi-component fiber.

16. The material of claim 12, wherein the conjugate fiber is a high density polyethylene/polyester sheath/core bi-component fiber.

17. The material of claim 10, in which the first ply of the creped hydrophobic microfine fiber structure is selected from the group consisting of ethylene/vinyl acetate copolymer, polyethylene, chlorinated polyethylene and polyvinyl chloride and the additional ply of the hydrophobic microfine fiber structure comprises isotactic polypropylene.

18. The material of claim 16, wherein the inner ply of the hydrophobic microfine fiber structure comprises isotactic polypropylene and the two outer plies comprise polyethylene.

19. The material of claim 12, wherein the outer plies of the hydrophobic microfine fiber structure are selected from the group consisting of ethylene/vinyl acetate copolymer, polyethylene, chlorinated polyethylene and polyvinyl chloride and may be the same or different.

20. The material of claim 19, wherein the inner ply of the hydrophobic microfine fiber structure comprises isotactic polypropylene.

21. The material of claim 12, wherein each ply of the hydrophobic microfine fiber structure was initially prepared by melt-blowing.

22. An operating room gown comprising the material of claim 1.

23. The material of claim 2, wherein said material has been bonded by means of a heated embossing calender, or by ultrasound.

24. The material of claim 3, wherein said conjugate fibers are eccentric core sheath/core bi-component fibers.

25. The material of claim 3 in which said layers of conjugate fibers are blended with from 5 to 40% by weight of non-conjugate fibers.

26. The material of claim 2 which when subjected to the hydrostatic head test at 7% elongation, retains at least about 70% of the hydrostatic head which is achieved at zero elongation.

27. A process for preparing an extensible water impervious laminated material having an improved hydrostatic head at higher extension comprising at least one reinforcing layer of nonwoven fibers bonded to at least one hydrophobic creped ply of microfine fibers having a fiber diameter of up to 10 microns, said process comprising forming an assembly of a precreped ply of said microfine fibers and at least one reinforcing layer of nonwoven fibers placed adjacent thereto; subjecting said assembly to a temperature sufficient to fuse said layers of nonwoven fibers to said creped ply of microfine fibers; and cooling the assembly.

28. A process for preparing an extensible water impervious laminated material having an improved hydrostatic head at higher extensions, comprising at least one layer of conjugate fibers, said layer of conjugate fibers having a first face and an opposite face, said conjugate fibers being composed of a lower melting component and a higher melting component, wherein a substantial proportion of the surfaces of said conjugate fibers comprises said lower melting component, said lower melting component of said conjugate fibers which lie on said first face being fuse bonded to a first ply of a creped hydrophobic structure comprising multiple plies of microfine fibers having a fiber diameter of up to 10 microns, which structure comprises said first ply and at least one additional ply, said first ply of said hydrophobic microfine fiber structure being thermoplastic and possessing a lower melt temperature than said additional ply of said structure, said lower melting component of said conjugate fibers having been fuse bonded at a temperature below the melt temperature of said higher melting component of said conjugate fibers so that the latter component retains its initial fiber-like integrity;

said process comprising forming an assembly of said hydrophobic microfine fiber structure which has been precreped and at least one layer of said conjugate fiber placed adjacent to said first ply of said hydrophobic microfine fiber structure;

subjecting said assembly to a temperature sufficient to fuse said lower melting component of said conjugate fibers which lie on said first face as well as the first ply of the hydrophobic microfine fiber structure in contact with said conjugate fibers without fusing the higher melting component of said conjugate fibers nor the additional ply of the hydrophobic microfine fiber structure, while maintaining said assembly under minimal pressure;

and cooling said assembly to resolidify said lower melting component of the conjugate fibers as well as said first ply of said hydrophobic microfine fiber structure, whereby said conjugate fibers are firmly bonded to said hydrophobic microfine fiber structure without impairing the integrity of said higher melting component of said fibers.

29. A process for preparing an extensible water impervious laminated material having an improved hydrostatic head at higher extensions comprising an inner creped hydrophobic microfine fiber structure sandwiched between two reinforcing layers of conjugate fibers, each of said layers of conjugate fibers having a first face and an opposite face, said conjugate fibers being composed of a lower melting component and a higher melting component, wherein a substantial proportion of the surfaces of said fibers comprises said lower melting component, said hydrophobic microfine fiber structure comprising a threeply structure having an inner ply sandwiched between and bonded to two outer plies, each ply comprising a web of microfine fibers having a fiber diameter of up to 10 microns, said inner ply of said hydrophobic microfine fiber structure having a melt temperature higher than the melt temperatures of each of said outer plies of said hydrophobic microfine fiber structure, said lower melting components of both layers of said conjugate fibers which lie on said first faces having been fuse bonded to the adjacent outer plies of said hydrophobic microfine fiber structure at a temperature below the melt temperature of said higher melting component of said conjugate fibers, so that the latter component retains its initial fiber-like integrity;

said process comprising forming an assembly of said hydrophobic microfine fiber structure which has been precreped, sandwiched between two layers of said conjugate fibers;

subjecting said assembly to a temperature sufficient to fuse said lower melting components of said conjugate fibers which lie on said first faces in both of said layers thereof as well as both of said outer plies of said hydrophobic microfine fiber structure without fusing the higher melting components of said conjugate fibers nor the inner ply of the hydrophobic microfine fiber structure, while maintaining the assembly under minimal pressure;

and cooling said assembly to resolidify said lower melting components of the fibers as well as said outer plies of said hydrophobic microfine fiber structure, whereby said fibers are firmly bonded to said hydrophobic microfine fiber structure without impairing the integrity of said higher melting component of said fibers.

30. The process of claim 28, wherein said fusing step is carried out by means of a heated embossing calender, or by application of ultrasound.

31. The process of claim 29, wherein said fusing step is carried out by means of a heated embossing calender, or by application of ultrasound.

* * * * *